Oct. 9, 1923.
F. SCHAEFER
RAILWAY BRAKE HANGER
Filed July 25, 1922
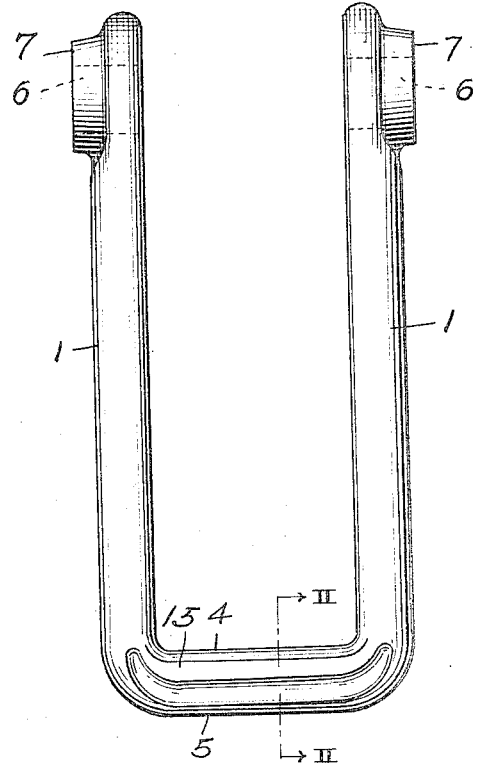
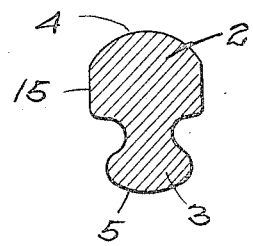
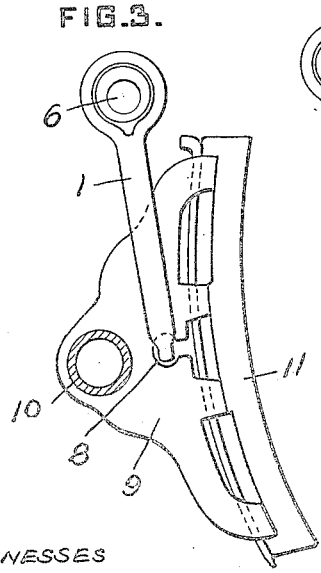
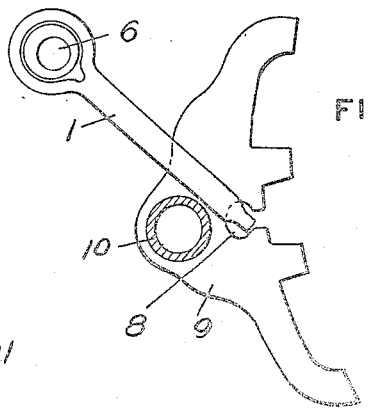
WITNESSES
J. Herbert Bradley.
INVENTOR
Frederic Schaefer,
by Winter & Brown,
his attorneys.

Patented Oct. 9, 1923.

1,470,121

UNITED STATES PATENT OFFICE.

FREDERIC SCHAEFER, OF PITTSBURGH, PENNSYLVANIA.

RAILWAY-BRAKE HANGER.

Application filed July 25, 1922. Serial No. 577,288.

*To all whom it may concern:*

Be it known that I, FREDERIC SCHAEFER, a citizen of the United States, and a resident of Pittsburgh, in the county of Allegheny and State of Pennsylvania, have invented a new and useful Improvement in Railway-Brake Hangers, of which the following is a specification.

In U. S. Patent No. 1,385,851 to J. M. Summers there is disclosed a railway brake hanger comprising spaced side arms and a transverse connecting arm in the form of a symmetrical I-beam having its flanges provided with relatively wide bearing faces of uniform extent. It has been found that by far the greater amount of wear on the transverse arm is on its upper face. The brake beam and its attached parts are supported by the upper face of the hanger almost continuously, and, when a car is in motion with the brakes unapplied, the constant vibration of the brake beam results in a very considerable amount of wear upon the upper bearing face of the hanger. About the only periods when the lower bearing face of the hanger is subjected to wear is when the brakes are applied to such of the wheel of a car as cause the brake beam to rise and bear upon the lower face of the hanger.

The object of this invention is to improve railway brake hangers of the type disclosed in the said Summers patent to the end that they will wear much longer. A further and more specific object is to so distribute the metal of the transverse arm of the hanger that the upper flange will have a greater bearing surface than the lower flange and that the wearing away of the upper flange will not result in a diminution of the extent of the bearing surface.

The invention is illustrated in the accompanying drawings of which Fig. 1 is a front view of a brake hanger, Fig. 2 a cross sectional view of its transverse arm, the plane of view being indicated by the line II—II, Fig. 1; Fig. 3 a side view of the brake hanger applied to a brake head; and Fig. 4 a view corresponding to Fig. 3 with the brake shoe omitted and the brake hanger in position to be applied to the brake head.

According to the invention the brake hanger comprises spaced side arms 1 and a transverse connecting arm in the form of an asymmetric I-beam having an upper flange 2 and a lower flange 3. The upper flange is of greater depth and width than the lower flange and both are provided with curved bearing faces, the bearing face 4 of the upper flange being of considerably greater extent than the bearing face 5 of the lower flange. Preferably, the upper flange has flat parallel side faces 15 enabling the brake hanger to be applied to a brake shoe in the usual manner, and also resulting in maintaining the upper bearing face of constant extent as the flange wears away in service.

The brake hanger is preferably forged from a rod the ends of which are upset to form enlargements for eyes 6 which are preferably thickened laterally as at 7 to resist wear. The side arms 1 of the hanger are preferably round, and the transverse arm is preferably so forged that its cross sectional area is substantially the same as that of the side arms.

The brake hanger is illustrated in Fig. 3 as arranged in a socket 8 of a brake head 9 attached to brake beam 10, the head being provided with a brake shoe 11. The socket 8 for receiving the transverse connecting arm of the brake hanger is, as is usual, provided with a longitudinal side opening of less width than the diameter of the socket so that the brake hanger may be inserted by turning it to a substantially horizontal position. Because flange 5 is narrower than the corresponding portion of the usual brake hangers, the hangers may be inserted in the manner shown in Fig. 4 without lowering the brake beam. Manifestly they may be inserted by turning them to the opposite substantially horizontal position in the manner indicated in the above-mentioned Summers patent. When the transverse arm is inserted in the socket and turned upwardly it is locked in position against removal from, otherwise than by its manner of assembly with the brake head.

In service the upper bearing face 4 of the upper flange 2 supports the brake head and through it the brake beam and other attached parts. The almost constant wear on the upper face of the flange is resisted by the enlarged bearing face which does not diminish in extent as the flange wears away. As a result of this disposition of available metal in the transverse arm of the hanger the life of the hanger is greatly prolonged.

According to the provisions of the patent statute I have described the principle and operation of my invention, together with what I now consider to represent the best embodiment thereof. However, I desire to have it understood that, within the scope of the appended claims, the invention may be practiced by other forms of construction than that particularly shown and described.

I claim:

1. A railway brake hanger comprising spaced side arms and a transverse arm connecting the side arms, the transverse arm consisting of an asymmetric I-beam having the faces of its upper and lower flanges curved and having the face of its upper flange substantially larger than that of its lower flange to form an increased bearing surface.

2. A railway brake hanger comprising spaced side arms and a transverse arm connecting the side arms, the transverse arm consisting of an I-beam having its upper and lower flanges provided with curved bearing faces, the upper flange being of greater depth and width than the lower flange thereby according an increased bearing surface of undiminishing extent due to wear.

3. A forged railway brake hanger comprising spaced substantially cylindrical side arms and a transverse arm connecting the side arms, the transverse arm consisting of an I-beam having its upper and lower flanges provided with curved bearing faces, the upper flange being of greater depth and width than the lower flange thereby affording an increased bearing surface of undiminishing extent due to wear, and the side and transverse arms being of substantially uniform cross-section throughout.

In testimony whereof, I sign my name.

FREDERIC SCHAEFER.

Witness:
EDWIN O. JOHNS.